United States Patent
Auxier et al.

(10) Patent No.: US 10,830,054 B2
(45) Date of Patent: Nov. 10, 2020

(54) INTERNALLY COOLED AIRFOIL

(71) Applicant: United Technologies Corporation, Farmington, CT (US)

(72) Inventors: James T. Auxier, Bloomfield, CT (US); Parth Jariwala, Iselin, NJ (US); Bret M. Teller, Menden, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 16/675,879

(22) Filed: Nov. 6, 2019

(65) Prior Publication Data

US 2020/0088042 A1    Mar. 19, 2020

Related U.S. Application Data (62) Division of application No. 15/096,243, filed on Apr. 11, 2016, now Pat. No. 10,508,552.

(51) Int. Cl.
*F01D 5/18* (2006.01)
*F01D 9/02* (2006.01)
(Continued)

(52) U.S. Cl.
CPC ............... *F01D 5/186* (2013.01); *F01D 5/18* (2013.01); *F01D 9/02* (2013.01); *F01D 11/08* (2013.01); *F01D 25/12* (2013.01); *F23R 3/002* (2013.01); *F05D 2220/32* (2013.01); *F05D 2230/21* (2013.01); *F05D 2230/211* (2013.01);
(Continued)

(58) Field of Classification Search
CPC . F01D 11/08; F01D 25/12; F01D 5/18; F01D 5/186; F01D 9/02; F23R 3/002; F05D 2220/32; F05D 2230/21; F05D 2230/211; F05D 2240/122; F05D 2240/127;
(Continued)

(56) References Cited

U.S. PATENT DOCUMENTS 5,931,638 A    8/1999  Krause
6,179,565 B1 *  1/2001  Palumbo ................. F01D 5/187
                                                   415/115
(Continued)

FOREIGN PATENT DOCUMENTS

EP    2713012    4/2014

OTHER PUBLICATIONS

EP Search report dated Oct. 6, 2017 in EP Application No. 17166119. 2.

(Continued)

*Primary Examiner* — Frank J Vineis
*Assistant Examiner* — Laura B Figg
(74) *Attorney, Agent, or Firm* — Snell & Wilmer L.L.P.

(57) ABSTRACT

A casting core may comprise a tip flag material having a forward cavity and a first spear cavity disposed aft of the forward cavity. A trailing edge discharge material may be separated from the tip flag material and include a first row of cavities. The first row of cavities may comprise a first racetrack cavity. A second row of cavities may be disposed aft of the first row of cavities and include a second racetrack cavity. A third row of cavities may be disposed aft of the second row of cavities and include a circular cavity. A fourth row of cavities may be disposed aft of the third row of cavities and include a second spear cavity.

10 Claims, 7 Drawing Sheets

(51) Int. Cl.
    *F01D 11/08*     (2006.01)
    *F01D 25/12*     (2006.01)
    *F23R 3/00*     (2006.01)

(52) U.S. Cl.
    CPC .. *F05D 2240/122* (2013.01); *F05D 2240/127* (2013.01); *F05D 2240/304* (2013.01); *F05D 2240/35* (2013.01); *F05D 2260/202* (2013.01); *F05D 2260/2212* (2013.01); *Y02T 50/60* (2013.01)

(58) Field of Classification Search
    CPC ........... F05D 2240/304; F05D 2240/35; F05D 2260/202; F05D 2260/2212; Y02T 50/676
    See application file for complete search history.

(56) References Cited

U.S. PATENT DOCUMENTS

| | | | |
|---|---|---|---|
| 2004/0202542 A1* | 10/2004 | Cunha | F01D 5/187 416/97 R |
| 2005/0169754 A1* | 8/2005 | Surace | F01D 5/16 416/97 R |
| 2008/0095636 A1* | 4/2008 | Cherolis | F01D 5/187 416/97 R |
| 2013/0243575 A1 | 9/2013 | Zelesky | |
| 2013/0251538 A1 | 9/2013 | Zess | |

OTHER PUBLICATIONS

USPTO; Pre-Interview First Office Action dated Sep. 11, 2018 in U.S. Appl. No. 15/096,243.
USPTO; Non-Final Office Action dated Dec. 27, 2018 in U.S. Appl. No. 15/096,243.
USPTO; Final Office Action dated Jul. 11, 2019 in U.S. Appl. No. 15/096,243.
USPTO; Notice of Allowance dated Oct. 2, 2019 in U.S. Appl. No. 15/096,243.

\* cited by examiner

INTERNALLY COOLED AIRFOIL

CROSS REFERENCE TO RELATED APPLICATIONS

This application is a divisional of, claims priority to, and the benefit of, U.S. Ser. No. 15/096,243, filed Apr. 11, 2016 and entitled "INTERNALLY COOLED AIRFOIL," which is hereby incorporated in its entirety for all purposes.

FIELD

The disclosure relates generally to gas turbine engines, and more particularly to an airfoil having internal cooling features.

BACKGROUND

In the pursuit of ever higher efficiencies, gas turbine manufacturers have long relied on higher and higher turbine inlet temperatures to provide boosts to overall engine performance. In typical modern engine applications, the gas path temperatures within the turbine exceed the melting point of the component constituent materials. To combat the demanding temperatures, dedicated cooling air may be extracted from the compressor and used to cool the gas path components, incurring significant cycle penalties. Cooled components may include, for example, rotating blades and stator vanes in the turbine.

One mechanism used to cool turbine airfoils includes utilizing internal cooling circuits and/or a baffle. Typically, numerous film cooling holes and high volumes of cooling fluid are used to provide airfoil cooling. To augment the internal cooling, a number of interior treatments to the passages have been implemented including pedestals, air jet impingement, and turbulator treatments for the walls. These internal cooling features are typically made by casting with the cores defining the internal features. More intricate cores typically result in higher manufacturing costs.

SUMMARY

A casting core is provided. The casting core may comprise a tip flag cavity having a forward pedestal and a first spear pedestal disposed aft of the forward pedestal. A trailing edge discharge cavity may be separated from the tip flag cavity and include a first row of pedestals. The first row of pedestals may comprise a first racetrack pedestal. A second row of pedestals may be disposed aft of the first row of pedestals and include a second racetrack pedestal. A third row of pedestals may be disposed aft of the second row of pedestals and include a circular pedestal. A fourth row of pedestals may be disposed aft of the third row of pedestals and include a second spear pedestal.

In various embodiments, a diameter of the first racetrack pedestal may be equal to a diameter of the second racetrack pedestal. A diameter of the spear pedestal may be greater than the diameter of the first racetrack pedestal. The diameter of the spear pedestal may be, for example, 0.026 inches. The first row of pedestals may have 12 racetrack pedestals, and the fourth row of pedestals may have 24 spear pedestals. The first row of pedestals may have a blockage of 71%. The second row of pedestals may have a blockage of 71%. The blockage of the third row of pedestals may be 51%, and the blockage of the fourth row may be 51%. A diameter of the forward pedestal may be equal to a diameter of the circular pedestal. The geometry of the first spear pedestal may be the same as the geometry of the second spear pedestal. The first row of pedestals may also be staggered relative to the second row of pedestals. The first spear pedestal may include a first depth and the second spear pedestal may include a second depth less than the first depth. The first depth may be, for example, 0.020 inches and the second depth may be 0.012 inches.

An airfoil is also provided. The airfoil may include comprise a tip flag cavity having a forward pedestal and a first spear pedestal disposed aft of the forward pedestal. A forward internal cavity may be configured to provide cooling fluid to the tip flag cavity. A trailing edge discharge cavity may be separated from the tip flag cavity and include a first row of pedestals. The first row of pedestals may comprise a first racetrack pedestal. A second row of pedestals may be disposed aft of the first row of pedestals and include a second racetrack pedestal. A third row of pedestals may be disposed aft of the second row of pedestals and include a circular pedestal. A fourth row of pedestals may be disposed aft of the third row of pedestals and include a second spear pedestal. A trailing edge cavity may be disposed aft of the forward cavity and configured to provide the cooling fluid to the trailing edge discharge cavity.

In various embodiments, a diameter of the first racetrack pedestal may be equal to a diameter of the second racetrack pedestal. A diameter of the spear pedestal may be greater than the diameter of the first racetrack pedestal. The first row of pedestals may have a blockage of 71%. The second row of pedestals may have a blockage of 71%. The blockage of the third row of pedestals may be 51%, and the blockage of the fourth row may be 51%. A diameter of the forward pedestal may be equal to a diameter of the circular pedestal. The first spear pedestal may comprise a first depth, and the second spear pedestal may comprise a second depth less than the first depth. For example, the first depth may be 0.020 inches and the second depth may be 0.012 inches.

An internally cooled engine component is also provided. The internally cooled engine component may comprise a tip flag cavity having a forward pedestal and a first spear pedestal disposed aft of the forward pedestal. A forward internal cavity may be configured to provide cooling fluid to the tip flag cavity. A trailing edge discharge cavity may be separated from the tip flag cavity and include a first row of pedestals. The first row of pedestals may comprise a first racetrack pedestal and have a blockage of 71%. A second row of pedestals may be disposed aft of the first row of pedestals and include a second racetrack pedestal. The second row may also have a blockage of 71%. A third row of pedestals may be disposed aft of the second row of pedestals and include a circular pedestal. The blockage of the third row may be 51%. A fourth row of pedestals may be disposed aft of the third row of pedestals and include a second spear pedestal. The blockage of the fourth row may also be 51%. A trailing edge cavity may be disposed aft of the forward cavity and configured to provide the cooling fluid to the trailing edge discharge cavity.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

The present disclosure relates to casting cores and air foils having internal cooling cavities. Cooling features in the internal cooling cavities may have varying shapes, sizes, and orientations. Cooling features included in airfoil and cores of the present disclosure include cylindrical pedestals, racetrack pedestals, and spear pedestals with each described in greater detail below.

The cooling features disclosed herein may provide a robust airfoil tip to resist a burn-through or rub-through without starving the majority of the part of airflow and causing a creep rupture, before detection can be made through borescope or other regular maintenance. Airfoils of the present disclosure may also back-pressure the leading edge feed and tip flag by using pedestals as described in greater detail below, so as to maintain adequate backflow margin for cooling holes. Center discharge of cooling flow from tip flag tends to reduce mixing losses to maintain stage efficiency, as opposed to pressure-side discharge. The center discharge shape of the tip flag may also maintains geometric alignment with remainder of trailing edge to maximize ease of manufacture of core and ease of finishing of casting. Core thickness at the trailing edge may be varied to balance between ease of manufacture, stage efficiency, and cooling flow utilization. Additionally, cylindrical pedestal may be axially placed to balance with the need for drilling of cooling holes into tip flag, and to provide ample spacing forward of spear for flow development.

Figure 1:
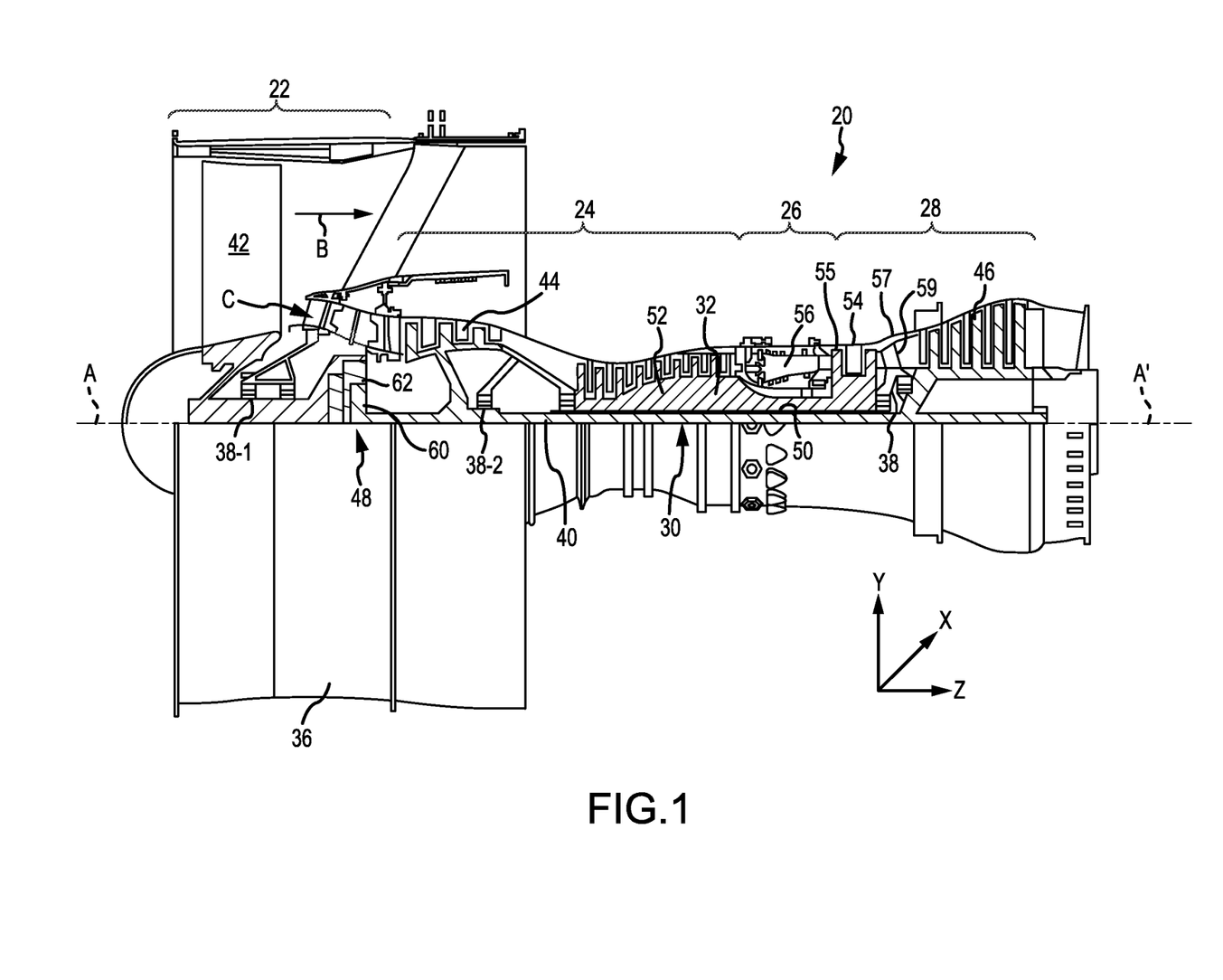
FIG. 1 illustrates an exemplary gas turbine engine, in accordance with various embodiments.

Referring now to FIG. 1, an exemplary gas turbine engine 20 is shown, in accordance with various embodiments. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive coolant (e.g., air) along a bypass-flow path B while compressor section 24 can drive coolant along a core-flow path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 via several bearing systems 38, 38-1, and 38-2. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low-pressure compressor 44 and a low-pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high-pressure compressor 52 and high-pressure turbine 54. Airfoils 55 coupled to a rotor of high-pressure turbine may rotate about the engine central longitudinal axis A-A' or airfoils 55 coupled to a stator may be rotationally fixed about engine central longitudinal axis A-A'.

A combustor 56 may be located between high-pressure compressor 52 and high-pressure turbine 54. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high-pressure" compressor or turbine experiences a higher pressure than a corresponding "low-pressure" compressor or turbine.

The core airflow along core-flow path C may be compressed by low-pressure compressor 44 then high-pressure compressor 52, mixed and burned with fuel in combustor 56, then expanded over high-pressure turbine 54 and low-pressure turbine 46. Mid-turbine frame 57 includes airfoils 59, which are in the core airflow path. Turbines 46, 54 rotationally drive the respective low speed spool 30 and high speed spool 32 in response to the expansion.

Gas turbine engine 20 may be, for example, a high-bypass ratio geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low-pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low-pressure compressor 44. Low-pressure turbine 46 pressure ratio may be measured prior to inlet of low-pressure turbine 46 as related to the pressure at the outlet of low-pressure turbine 46 prior to an exhaust nozzle. It should be understood, however, that the above parameters are exemplary of various embodiments of a suitable geared architecture engine and that the present disclosure contemplates other turbine engines including direct drive turbofans.

Airfoil 55 may be an internally cooled component of gas turbine engine 20. Trip strips may be located in internal cooling cavities of internally cooled engine parts, as detailed further below. Internally cooled engine parts may be discussed in the present disclosure in terms of airfoils. However, the present disclosure applies to any internally cooled engine component (e.g., blade outer air seals, airfoil platforms, combustor liners, blades, vanes, or any other internally cooled component in a gas turbine engine).

Figure 2:
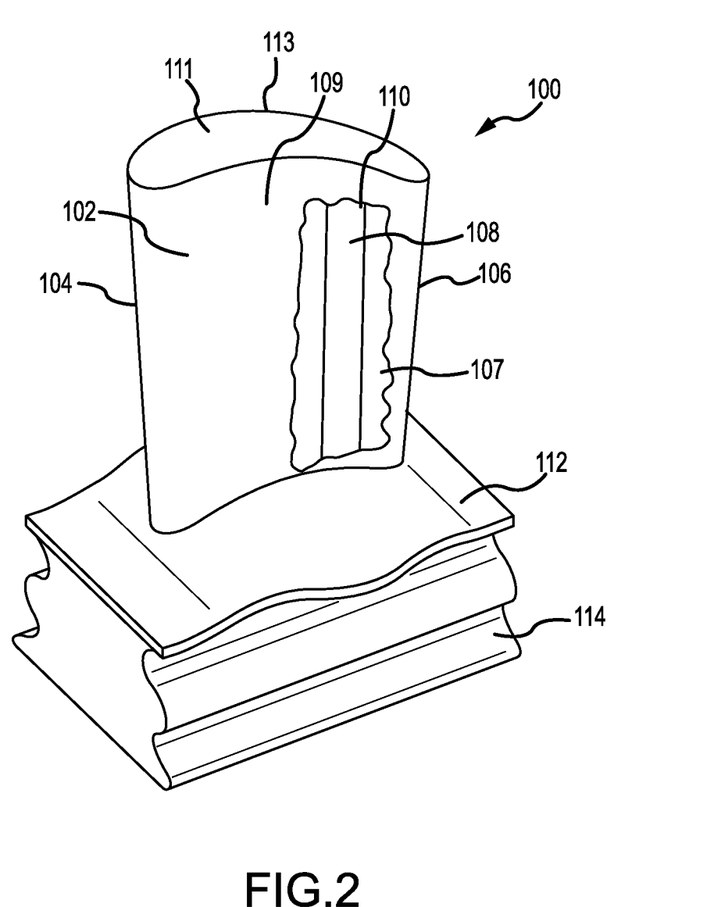
FIG. 2 illustrates an exemplary air foil having an internal cooling passage, in accordance with various embodiments.

With reference to FIG. 2, an airfoil 100 is shown with cooling passage 108, in accordance with various embodiments. Although an airfoil is shown, the present disclosure applies to any internally cooled part (e.g., blade outer air seals, airfoil platforms, combustor components, etc.). Airfoil 100 has a pressure side 102, a leading edge 104, and a trailing edge 106. Airfoil 100 also includes top 111 and suction side 113. Pressure side 102 surface is partially cutaway to illustrate cooling passages 108 defined be internal walls of airfoil 100. Hot air flowing through a gas turbine engine may first contact leading edge 104, flow along pressure side 109 and/or suction side 113, and leave airfoil at trailing edge 106.

In various embodiments, material 107 may define internal passages such as cooling passage 108. Cooling passage 108 is oriented generally in a direction from platform 112 and attachment 114 towards top 111 (i.e., a radial direction when airfoil 100 is installed in a turbine). Airfoil 100 may contain multiple cooling passages or chambers similar to cooling passage 108 oriented in various directions with varying hydraulic diameters. The internal cooling passages may be interconnected. Multiple cooling features may appear in the internal cooling passages, as illustrated in further detail below.

Figure 3:
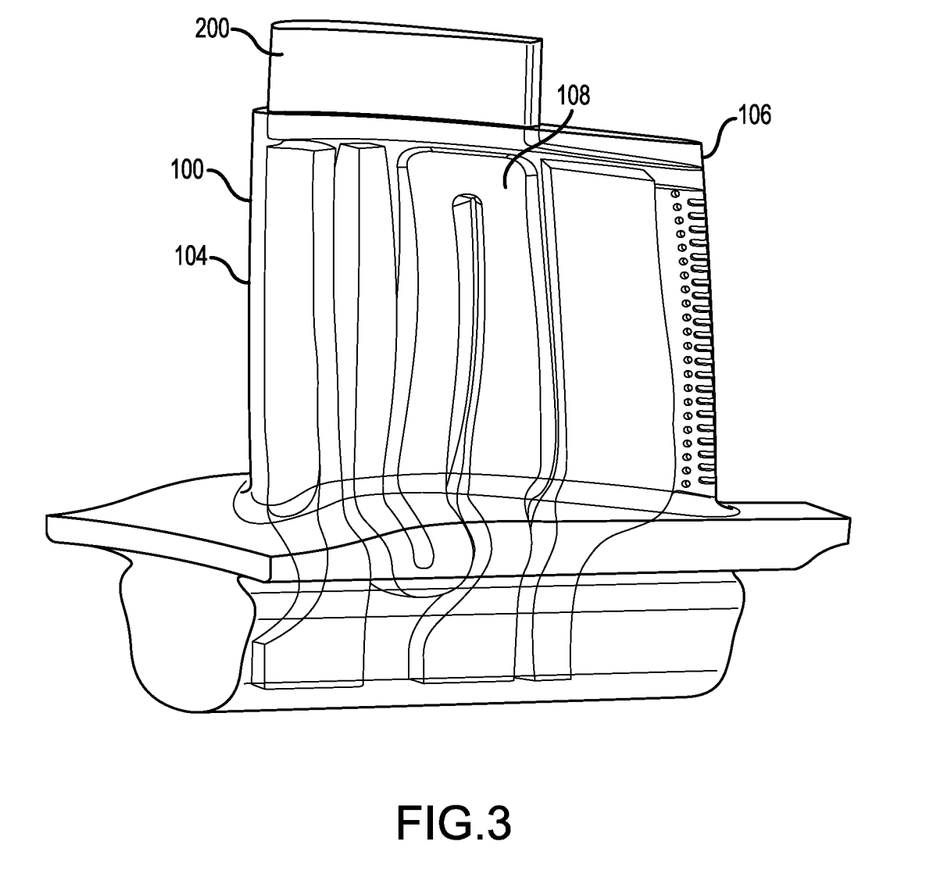
FIG. 3 illustrates a cast core for casting an airfoil, in accordance with various embodiments.

With reference to FIG. 3, a cast core 200 is shown, in accordance with various embodiments. Cast core 200 may be used in casting airfoil 100 to define internal features. Cast core 200 may define features aft of leading edge 104 and up to trailing edge 106 in airfoil 100. Cast core 200 may extend beyond trailing edge 106 of airfoil 100 during the casting process to define aft cooling openings. Cast core 200 may define cooling passage 108 of airfoil 100 and cooling features therein. In that regard, both airfoil 100 and cast core 200 may have the cooling passages and cooling features described herein.

The features of cast core 200 may be negatives of the cooling features described below with respect to an airfoil 100. Stated another way, cavities, openings, passages, and the like of airfoil 100 may be defined by material in cast core 200. Cooling features and pedestals of airfoil 100 that are defined by material in airfoil 100 as described herein may be formed as passages and openings in cast core 200. Thus, the features described below as pedestals and cooling passages may describe the structure of an airfoil 100 and/or a cast core 200.

Cast core 200 may be placed in a mold, and the material to form a component (e.g., airfoil 100) may be deposited in the mold. Cast core 200 may be removed from the component, leaving cavities and the desired cooling features in the component. Airfoil 100 (as well as other components using fluid turbulation) may be made from an austenitic nickel-chromium-based alloy such as that sold under the trademark Inconel® which is available from Special Metals Corporation of New Hartford, N.Y., USA, or other materials capable of withstanding exhaust temperatures.

In various embodiments, FIGS. 4-6C illustrate potential cooling feature configurations that may be formed on a cast core 200 or on a component such as airfoil 100. When formed on a cast core 200, the cooling features may appear as indentations and/or passages. When formed on a component (e.g., airfoil 100), the cooling feature configurations may protrude from and/or across an internal passage.

Figure 4:
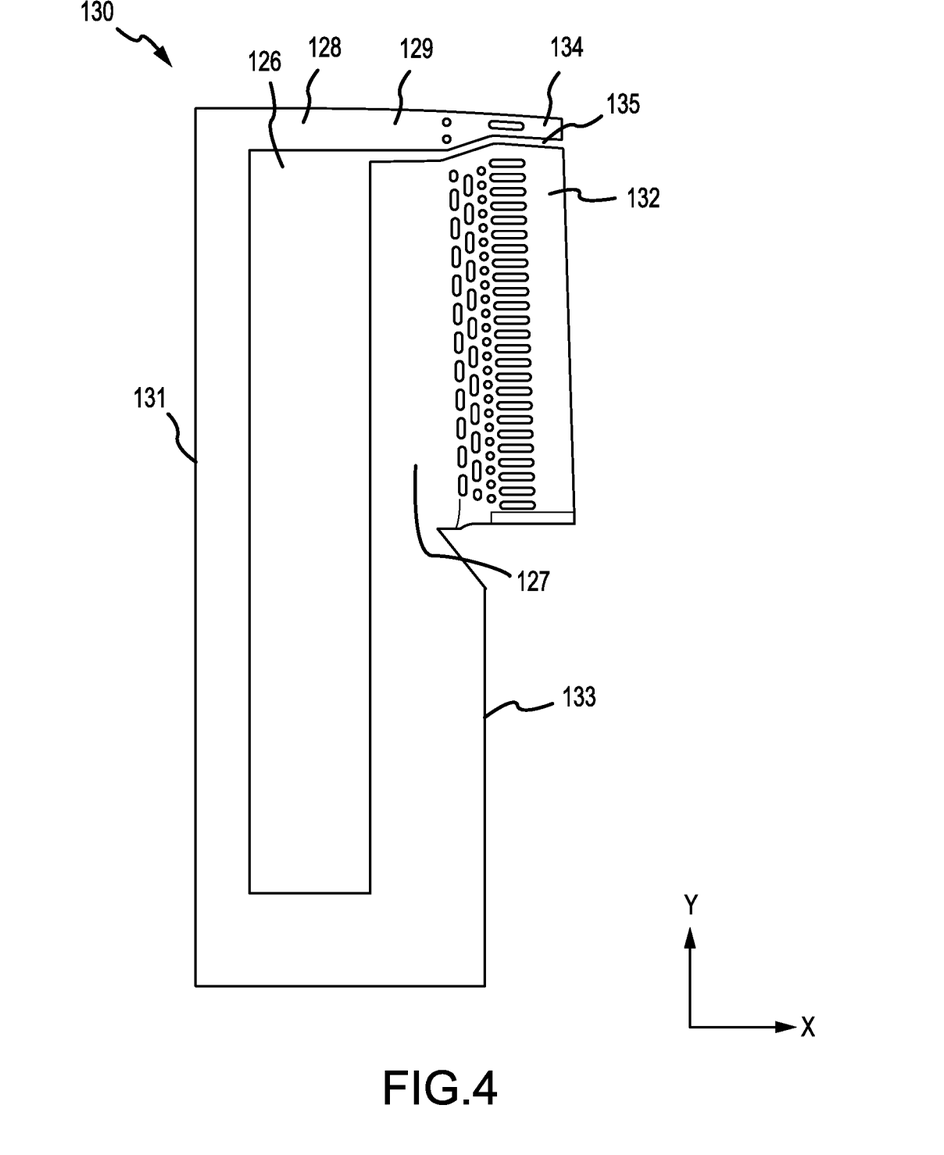
FIG. 4 illustrates the location of internal cooling features proximate the trailing edge in an internally cooled airfoil, in accordance with various embodiments.

With reference to FIG. 4, an internal cooling configuration of an airfoil is shown as defined on a core 130 (also referred to as a casting core) similar to or identical to cast core 200 of FIG. 3, in accordance with various embodiments. Casting may be used to form airfoil 100 of FIG. 2. To cast an airfoil 100 or another internally cooled component with a cooling passage 108, a core 130 may be formed. The core of the component wall may have a negative of the internal cooling features described herein. In that regard, pedestals inside the airfoil may be defined by cavities 126 in core 130. Similarly, passages in the airfoil are occupied by the material 128 of core 130. In that regard, core 130 may be configured as a negative of the internal passages of airfoil 100.

In various embodiments, core 130 may be placed in a mold, and the material to form the internally cooled component may be deposited in the mold. The core 130 may be removed from the internally cooled component, leaving a cavity with the desired internal cooling features. Airfoil 100 (as well as other internally cooled components) may be made from an austenitic nickel-chromium-based alloy such as that sold under the trademark Inconel® which is available from Special Metals Corporation of New Hartford, N.Y., USA, or other materials capable of withstanding exhaust temperatures.

With reference to FIGS. 2 and 4, core 130 may include a leading edge 131 and a trailing edge 133 that correspond to the interior surfaces of leading edge 104 and trailing edge 106 of FIG. 1, respectively. Tip flag cavity 134 and trailing edge discharge cavity 132 may be defined by material 128 of core 130. Tip flag cavity 134 and trailing edge discharge cavity 132 may be disposed at trailing edge 133 of core 130. Leading edge cavity 129 may feed tip flag cavity 134. Trailing edge cavity 127 may feed trailing edge discharge cavity 132. In that regard, a separate cooling channel may feed tip flag cavity 134 and trailing edge discharge cavity 132.

During operation in airfoil 100 (of FIG. 2), coolant (e.g., air) may flow in the y direction (a radial direction with respect to axis A-A' when an airfoil is mounted to a rotor or stator) into leading edge cavity 129 and trailing edge cavity 127. The coolant may then move in the x direction (an axial direction axis A-A' when an airfoil is mounted to a rotor or stator) towards tip flag cavity 134 and trailing edge discharge cavity 132, where the coolant may be ejected from airfoil 100 to provide film cooling and limit back flow.

Figure 5:
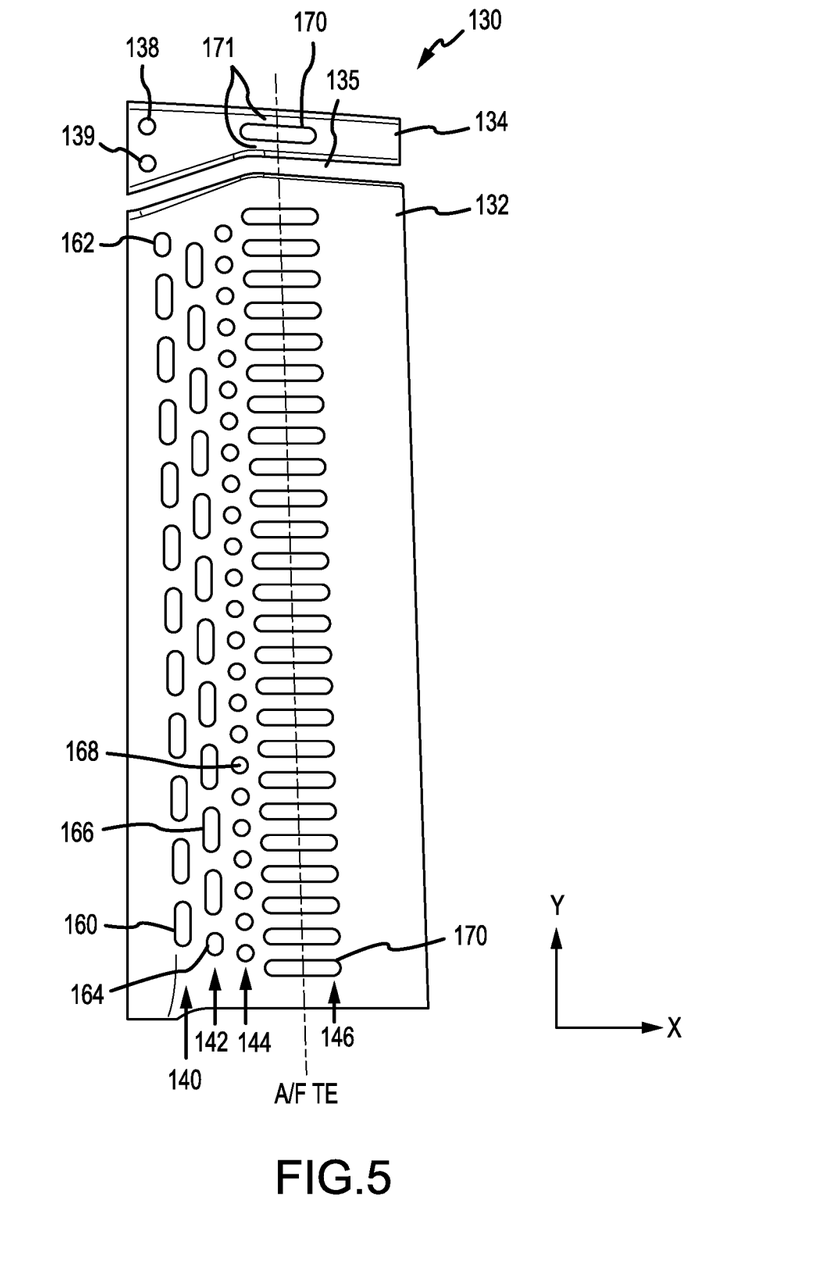
FIG. 5 illustrates the geometry and orientation of internal cooling features in an internally cooled airfoil, in accordance with various embodiments.

Referring now to FIG. 5, tip flag cavity 134 and trailing edge discharge cavity 132 are shown, in accordance with various embodiments. Tip flag cavity 134 of core 130 and may include pedestals of airfoil 100 (of FIG. 2) defined by openings in core 130. Pedestals on tip flag cavity 134 may have a depth (into and out of the page) greater than the depth of pedestals on trailing edge discharge cavity 132. For example, pedestals on tip flag cavity 134 may comprise a depth of 0.02 inches (0.5 mm) and pedestals on trailing edge discharge cavity 132 may comprise a depth of 0.012 inches (0.30 mm).

In various embodiments, forward pedestal 138 and forward pedestal 139 may be aligned in the y direction (i.e., a radial direction when airfoil 100 is mounted to a rotor or stator). Forward pedestal 138 and forward pedestal 139 may have the same cylindrical geometry and be disposed at an intake to tip flag cavity 134. The forward pedestals may be disposed forward of spear pedestal 170. Spear pedestal 170 may define discharge slots 171 extending in the x direction above and below (in the y direction) spear pedestal 170. The trailing edge 106 of airfoil 100 (of FIG. 2) is represented by the broken line labeled A/F TE. Thus, discharge slots 171 may include an exhaust port at the intersection of spear pedestal 170 and A/F TE.

In various embodiments, separation 135 may be defined between tip flag cavity 134 and trailing edge discharge cavity 132. In airfoil 100, separation 135 may be filled with material to define tip flag cavity 134 and trailing edge discharge cavity 132. Trailing edge discharge cavity 132 may include four vertical (in the y direction) rows of pedestals. Forward racetrack row 140, aft racetrack row 142, circular row 144, and spear row 146. Each row may comprise of a plurality of pedestals aligned in they direction.

In various embodiments, forward racetrack row 140 may comprise a plurality of racetrack pedestals 160. Racetrack pedestals 160 may be elongated in the y direction with circular bottom and top contours (in the y direction). The racetrack pedestals may be aligned in the y direction with a shortened racetrack pedestal 162 disposed at the top (in the y direction) of forward racetrack row 140 of trailing edge discharge cavity 132.

In various embodiments, aft racetrack row 142 may comprise a plurality of racetrack pedestals 166. Racetrack pedestals 166 may be elongated in the y direction with circular bottom and top contours (in the y direction). Racetrack pedestals 166 may be aligned in the y direction with a shortened racetrack pedestal 164 disposed at the bottom (in the y direction) of aft racetrack row 142 of trailing edge discharge cavity 132. Racetrack pedestals of forward racetrack row 140 may be staggered with racetrack pedestals of aft racetrack row 142 so that the openings between adjacent racetrack pedestals 160 (of forward racetrack row 140) generally do not align in the x direction with the openings between adjacent racetrack pedestals 166 (of aft racetrack row 142).

In various embodiments, circular row 144 may include a plurality of circular pedestals 168 aligned in the y direction. Circular pedestals 168 may have a circular geometry. Circular pedestals 168 may also be disposed aft of forward racetrack row 140, aft of aft racetrack row 142, and forward of spear row 146. The pitch and diameter of circular pedestals 168 may be selected so that every other circular pedestal 168 aligns in the x direction with an opening between adjacent racetrack pedestals 166 of aft racetrack row 142.

In various embodiments, spear row 146 may be disposed aft of circular row 144. Spear row may comprise a row of spear pedestals 170. Spear pedestals may comprise a spear geometry having a greater width (in the y direction) at a forward portion of the spear pedestal than at an aft portion of the spear pedestal, as described below with reference to FIG. 6B. Different spear pedestals 170 in spear row 146 may include substantially symmetric lengths (in the x direction) and widths (in the y direction). Spear pedestals in spear row 146 may have a pitch and dimensions such that each spear pedestal 170 aligns in the x direction with an opening between adjacent circular pedestals 168.

Exemplary dimension ranges and dimensions of the pedestals in each row (with the exception of shortened racetrack pedestal 162 and shortened racetrack pedestal 164) are provided in tables T1 and T2 below. The dimensions in tables T1 and T2 may be varied by +/−5% and may also vary by manufacturing tolerances. Additionally, the dimensions may be scaled with the dimensions of a core and/or airfoil. The shortened racetrack pedestals may have the same diameter and as the racetrack pedestals in the same row with a shorter height. Height and pitch are defined in the y direction. Blockage is the arithmetic equivalent to height divided by pitch and is thus the blockage percentage in the y direction.

TABLE T1

Exemplary dimensions of pedestals in each row.

|  | ROW 140 | ROW 142 | ROW 144 | ROW 146 |
|---|---|---|---|---|
| SHAPE | RACE-TRACK | RACE-TRACK | CIRCULAR | SPEAR |
| NUMBER | 12 | 12 | 24 | 25 |
| DIAMETER (in) | 0.025 | 0.025 | 0.026 | 0.026 |
| DIAMETER (mm) | 0.64 | 0.64 | 0.66 | 0.66 |
| HEIGHT (in) | 0.072 | 0.072 | — | — |
| HEIGHT (mm) | 1.8 | 1.8 |  |  |
| PITCH (in) | 0.102 | 0.102 | 0.051 | 0.051 |
| PITCH (mm) | 2.59 | 2.59 | 1.30 | 1.30 |
| BLOCKAGE | 71% | 71% | 51% | 51% |

TABLE T2

Exemplary dimension ranges of pedestals in each row.

|  | ROW 140 | ROW 142 | ROW 144 | ROW 146 |
|---|---|---|---|---|
| SHAPE | RACETRACK | RACETRACK | CIRCULAR | SPEAR |
| NUMBER | 10-14 | 10-14 | 20-30 | 20-31 |
| DIAMETER (in) | 0.02-0.03 | 0.02-0.03 | 0.021-0.031 | 0.021-0.031 |

TABLE T2-continued

Exemplary dimension ranges of pedestals in each row.

|  | ROW 140 | ROW 142 | ROW 144 | ROW 146 |
| --- | --- | --- | --- | --- |
| DIAMETER (mm) | 0.51-0.76 | 0.51-0.76 | 0.53-0.79 | 0.53-0.79 |
| HEIGHT (in) | 0.06-0.08 | 0.06-0.08 | — | — |
| HEIGHT (mm) | 1.5-2.0 | 1.5-2.0 | | |
| PITCH (in) | 0.09-0.11 | 0.09-0.11 | 0.04-0.06 | 0.04-0.06 |
| PITCH (mm) | 2.29-2.79 | 2.29-2.79 | 1.02-1.52 | 1.02-1.52 |
| BLOCKAGE | 60%-80% | 60%-80% | 40%-60% | 40%-60% |

Figure 6A:
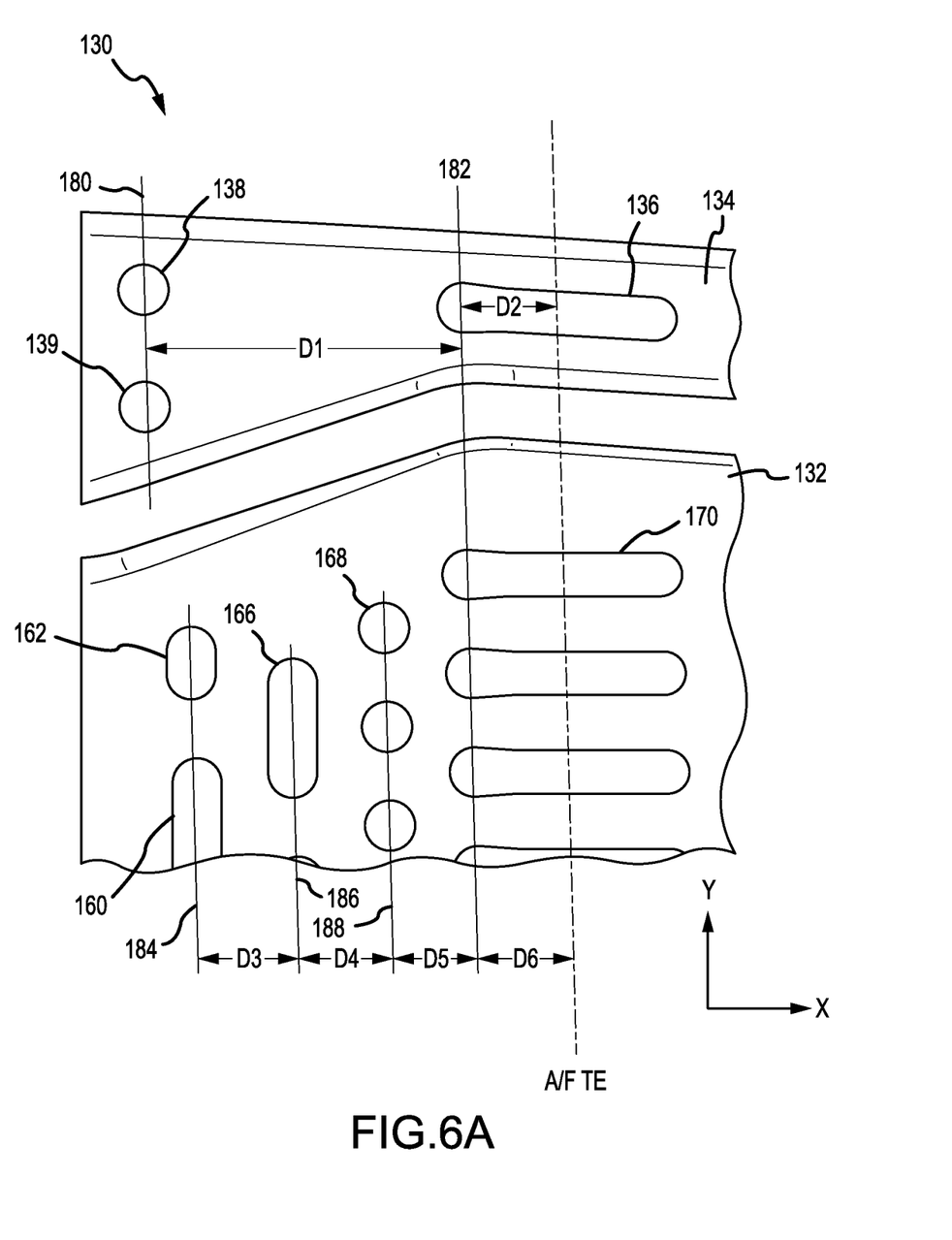
FIG. 6A illustrates the dimensions and orientation of internal cooling features in the trailing edge of an airfoil and/or core, in accordance with various embodiments.
Figure 6B:
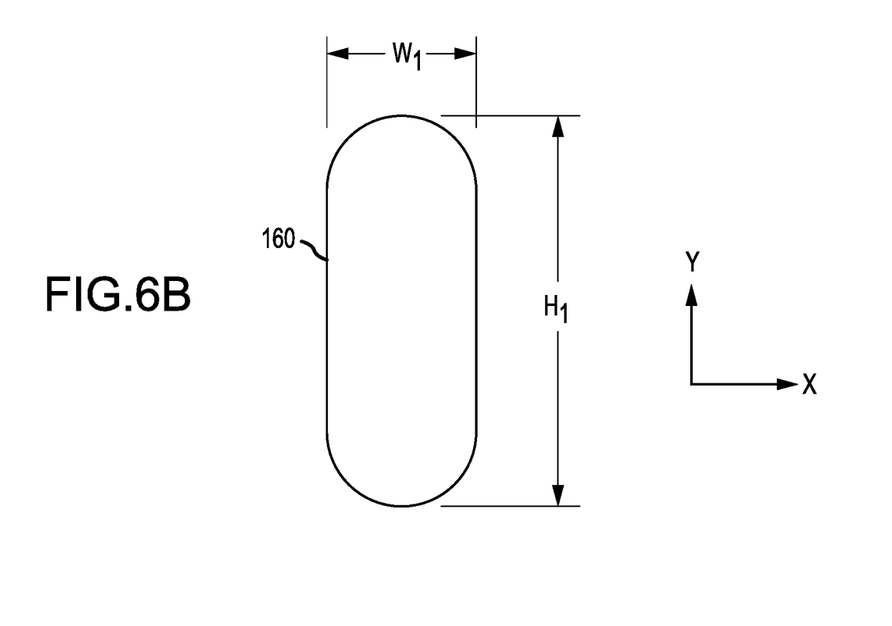
FIG. 6B illustrates the geometry of a racetrack pedestal in the trailing edge of an airfoil and/or core, in accordance with various embodiments.
Figure 6C:
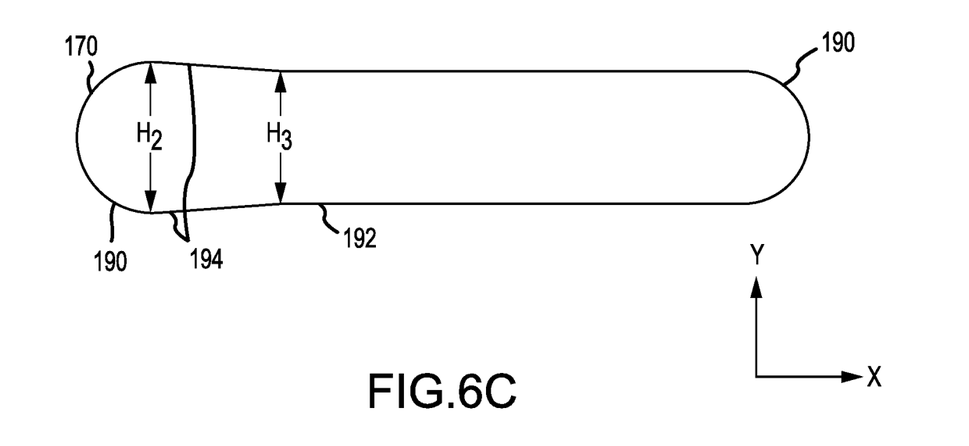
FIG. 6C illustrates the geometry of a spear pedestal in the trailing edge of an airfoil and/or core, in accordance with various embodiments.

Referring now to FIGS. 6A through 6C, the geometry and orientation of pedestals disposed in tip flag cavity 134 and trailing edge discharge cavity 132 of core 130 are shown, in accordance with various embodiments. Forward pedestal 138 and forward pedestal 139 of tip flag cavity 134 may be aligned in the y direction and have substantially the same diameter. The center of the forward pedestals (disposed on row center line 180) may be forward of the center of the forward circular portion (disposed on row center line 182) of spear pedestal 136 by a distance $D_1$ in the x direction. In various embodiments, distance $D_1$ may be 0.165 inches (4.2 mm), 0.16-0.17 inches (4.0-4.3 mm), or 0.15-0.18 inches (3.8-4.6 mm). The center of the forward circular portion (disposed on row center line 182) of spear pedestal 136 may be forward of A/F TE by a distance $D_2$ in the x direction. Distance $D_2$ may be, for example, 0.05 inches (1.3 mm), 0.04-0.06 inches (1.0-1.5 mm), or 0.03-0.07 inches (0.76-1.8 mm).

In various embodiments, shortened racetrack pedestal 162 may be aligned with racetrack pedestals 160 in the y direction with the center of the pedestals aligned on row center line 184. Similarly, racetrack pedestals 166 may be aligned in the y direction with the center of racetrack pedestals 166 aligned on row center line 186. The center of racetrack pedestals 160 and shortened racetrack pedestals 162 may be forward of the center of racetrack pedestals 166 by a distance $D_3$ in the x direction. Stated another way, row center line 184 may be forward of row center line 186 by distance $D_3$. $D_3$ may be, for example, 0.50 inches (1.3 mm), 0.45-0.55 inches (11.4-14.0 mm), or 0.4-0.6 inches (10.2-15.2 mm).

In various embodiments, circular pedestals 168 may be aligned in the y direction with the center of circular pedestals 168 aligned on row center line 188. The center of circular pedestals 168 may be aft of the center of racetrack pedestals 166 by a distance $D_4$ in the x direction. Thus, row center line 188 may be aft of row center line 186 by distance $D_4$. Distance $D_4$ may be, for example, 0.0505 inches (1.3 mm), 0.045-0.055 inches (1.1-1.4 mm), or 0.04-0.06 inches (1.0-1.5 mm).

In various embodiments, spear pedestals 170 of trailing edge discharge cavity 132 may be aligned with spear pedestal 1436 of tip flag cavity 134 in the y direction. Circular pedestals 168 may be aligned in the y direction with the center of circular pedestals 168 (disposed on row center line 188) forward of the center of the forward circular portion (disposed on row center line 182) of spear pedestal 136 by a distance $D_6$. $D_6$ may be, for example, 0.051 inches (1.3 mm), 0.045-0.055 inches (1.1-1.4 mm), or 0.04-0.06 inches (1.0-1.5 mm).

Referring now to FIGS. 6B and 6C, the geometries of racetrack pedestal 160 (and other racetrack pedestals) and spear pedestals 170 are shown, in accordance with various embodiments. Racetrack pedestals may have a racetrack shape. The racetrack shape may be defined by two parallel surfaces joined on either end by a half circular end. The half circular end may have a diameter equal to width $W_1$. The parallel surfaces may be separated by width $W_1$ in the x direction. Width $W_1$ may be, for example, 0.025 inches (0.64 mm). The racetrack pedestals may also comprise a height $H_1$ in the y direction. Height $H_1$ may be, for example, 0.072 inches (1.8 mm) or in a range such as 0.06-0.08 inches (1.5-2.0 mm).

In various embodiments, spear pedestals 170 may differ from racetrack pedestals 160 in geometry. Spear pedestals may comprise a forward circular portion 190 having a diameter $H_2$ and an aft parallel portion 192 having a height $H_3$, with $H_3$ less than $H_1$. Aft parallel portion 192 may be connected to forward circular portion 190 by non-parallel surfaces 194. Aft parallel portion 192 may also comprise aft circular portion 196 having a diameter of $H_3$, which is the same as the height $H_3$ of aft parallel portion 192. The values of $H_2$ and $H_3$ may be, for example, 0.026 inches (0.66 mm) and 0.0225 inches (0.57 mm), respectively. $H_2$ and $H_3$ may also be in a range with $H_2$ greater than $H_3$ such as, for example, $H_2$ ranging from 0.021-0.031 inches (0.53-0.79) and $H_3$ ranging from 0.0175-0.0275 inches (0.44-0.70 mm).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A casting core, comprising:
   a tip flag material comprising a forward cavity and a first spear cavity disposed aft of the forward cavity; and
   a trailing edge discharge material separated from the tip flag material and comprising,
      a first row of cavities comprising a first racetrack cavity,
      a second row of cavities aft of the first row of cavities, the second row of cavities comprising a second racetrack cavity,
      a third row of cavities aft of and spaced apart from the second row of cavities in an aft direction, the third row of cavities comprising a circular cavity, and
      a fourth row of cavities aft of the third row of cavities, the fourth row of cavities comprising a second spear cavity, wherein:
         the first spear cavity and the second spear cavity each comprise a forward circular portion and an aft circular portion connected by an aft parallel portion and non-parallel surfaces,
         the forward circular portion comprises a greater diameter than the aft circular portion, and
         the first racetrack cavity and the second racetrack cavity each comprise two parallel surfaces joined on either end by a half circular end.

2. The casting core of claim 1, wherein a first diameter the half circular end of the first racetrack cavity is equal to a diameter of the half circular end of the second racetrack cavity.

3. The casting core of claim 2, wherein a third diameter of the first spear cavity is greater than the first diameter of the first racetrack cavity.

4. The casting core of claim 3, wherein the third diameter of the first spear cavity is 0.026 inches.

5. The casting core of claim 1, wherein the first row of cavities comprises 12 racetrack cavities, and the fourth row of cavities comprises 24 spear cavities.

6. The casting core of claim 1, wherein a first diameter of the forward cavity is equal to a second diameter of the circular cavity.

7. The casting core of claim 1, wherein a first geometry of the first spear cavity is the same as a second geometry of the second spear cavity.

8. The casting core of claim 1, wherein the first row of cavities is staggered relative to the second row of cavities.

9. The casting core of claim 1, wherein the first spear cavity comprises a first depth and the second spear cavity comprises a second depth less than the first depth.

10. The casting core of claim 9, wherein the first depth is 0.020 inches and the second depth is 0.012 inches.

* * * * *